US007729552B2

(12) United States Patent
Lee et al.

(10) Patent No.: US 7,729,552 B2
(45) Date of Patent: Jun. 1, 2010

(54) APPARATUS AND METHOD FOR IMPROVING QUALITIES OF MOTION AND STILL IMAGES TO BE OUTPUT IN A MOBILE COMMUNICATION TERMINAL

(75) Inventors: Seung-Cheol Lee, Suwon-si (KR); Sang-Bong Lee, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 73 days.

(21) Appl. No.: 11/857,135

(22) Filed: Sep. 18, 2007

(65) Prior Publication Data

US 2008/0069466 A1 Mar. 20, 2008

(30) Foreign Application Priority Data

Sep. 18, 2006 (KR) ...................... 10-2006-0090300

(51) Int. Cl.
*G06K 9/00* (2006.01)
*G06K 15/00* (2006.01)

(52) U.S. Cl. ...................................... 382/252; 358/3.03

(58) Field of Classification Search ................. 382/252; 358/3.03

See application file for complete search history.

(56) References Cited

U.S. PATENT DOCUMENTS 5,402,513 A * 3/1995 Schafer ...................... 382/298
5,506,604 A 4/1996 Nally et al.
6,172,768 B1 * 1/2001 Yamada et al. ............... 358/1.9
6,381,275 B1 * 4/2002 Fukuhara et al. ....... 375/240.06
2004/0066363 A1 * 4/2004 Yamano et al. ............... 345/98
2004/0174463 A1 9/2004 Long
2005/0093981 A1 * 5/2005 Nonaka ................. 348/207.99

FOREIGN PATENT DOCUMENTS

| | | |
|---|---|---|
| JP | 09-185353 | 7/1997 |
| JP | 10-257310 | 9/1998 |
| KR | 1998-060822 | 10/1998 |
| KR | 100335621 | 4/2002 |
| KR | 1020060024136 | 3/2006 |
| WO | WO 2005/084033 | 9/2005 |

* cited by examiner

*Primary Examiner*—Wenpeng Chen
(74) *Attorney, Agent, or Firm*—The Farrell Law Firm, LLP

(57) ABSTRACT

An apparatus and method for improving qualities of motion and still images to be output in a mobile communication terminal. An error-reflected-value table is provided to reduce a computation amount while applying an error diffusion process. The table includes quantization-error-reflected values pre-computed according to maximum values of quantization errors and error-reflected ratios of neighboring pixels. When quantization errors of a specific pixel of an original image selected in a process procedure are computed, error-reflected values of neighboring pixels are determined. Pixel-by-pixel error values are stored by accumulating error-reflected values related to pixels. When error-reflected values of neighboring pixels around all the pixels of the original mage are completely computed, an image in which quantization errors are diffused is generated when the error-reflected values are added on a pixel-by-pixel basis. The error-diffused image is stored and displayed in place of the original image when a user makes a request.

25 Claims, 6 Drawing Sheets

APPARATUS AND METHOD FOR IMPROVING QUALITIES OF MOTION AND STILL IMAGES TO BE OUTPUT IN A MOBILE COMMUNICATION TERMINAL

PRIORITY

This application claims priority under 35 U.S.C. §119(a) to a Korean Patent Application filed in the Korean Intellectual Property Office on Sep. 18, 2006 and assigned Ser. No. 2006-90300, the disclosure of which is incorporated herein by reference.

BACKGROUND OF THE INVENTION

1. Field of the Invention

The present invention generally relates to a mobile communication terminal and, more particularly, to an apparatus and method for improving qualities of motion and still images to be output in a mobile communication terminal.

2. Description of the Related Art

Mobile phones on the market today are mobile communication terminals in which multimedia functions, such as two-to-eight mega pixel digital camera functions and the like, as well as broadcast service functions for Digital Video Broadcasting-Handheld (DVB-H), Digital Multimedia Broadcasting (DMB), etc., are embedded to process high-quality images. Up-to-date mobile communication terminals may process high-quality media data in a 24-bit color representation scheme by adopting a superior system processor and memory than those of legacy systems.

Although internal structures of systems for processes and memories of mobile communication terminals continuously develop, display devices of mobile communication terminals, that is, Liquid Crystal Displays (LCDs), do not follow the development speed of the internal structures of the systems. Today, a majority of up-to-date mobile communication terminals use LCD display devices limited to 65,536 color representations in a 16-bit color representation scheme. Thus, high-quality images stored in a system in which 16,777,216 color representations are possible in a 24-bit color representation scheme are quantized to 16-bit colors once more in an LCD display device. A user can view only an image of 16-bit color quality due to a physical limitation of display hardware even when an original image is of 24-bit color quality.

In general, when a 24-bit color image has a Red-Green-Blue (RGB) color format, 8 bits are allocated to color signals of red, green, and blue. In a 16-bit color image different from a 24-bit color image, 5 bits are allocated to red, 6 bits are allocated to green, and 5 bits are allocated to blue. The three colors are mixed to generate a color image. When a 24-bit color image is converted into a 16-bit color image, errors occur upon quantization since bits allocated to red are reduced by 3 bits, bits allocated to green are reduced by 2 bits, and bits allocated to blue are reduced by 3 bits. For this reason, image quality is degraded. There is a problem in that discontinuous color variation occurs due to a difference from the original image.

To solve quantization errors, a color printer or Plasma Display Panel Television (PDP TV) uses an error diffusion process. A known error diffusion process diffuses quantization errors between an original pixel and a quantized pixel to four neighboring pixels around the quantized pixel. When the four neighboring pixels to which the quantization errors are diffused are fed back, visual quantization errors can be reduced.

Research has been conducted to more efficiently reduce quantization errors than those of the feedback mechanism of four neighboring pixels. Research results show that quantization errors can be efficiently reduced by reflecting random weights in current quantization errors. FIG. 1 shows a conventional example of weights provided in an error diffusion process to reduce quantization errors.

In FIG. 1, $N_3$ 100, $N_4$ 106, $N_5$ 104, and $N_6$ 102 are neighboring pixels around a current quantized pixel. In an error diffusion process, different random values are allocated based on positions of the neighboring pixels. The different random values are 7/16, 1/16, 5/16, and 3/16, as shown in FIG. 1.

In FIG. 1, 7/16 of the quantization error of the current quantized pixel is diffused to $N_3$100, 3/16 of the quantization error of the current quantized pixel is diffused to $N_4$ 106, 5/16 of the quantization error of the current quantized pixel is diffused to $N_5$ 104, and 1/16 of the quantization error of the current quantized pixel is diffused to $N_6$ 102. When the above-described error diffusion process is completed, $N_3$ 100 is quantized. In this case, 5/16of the quantization error occurred in a process for quantizing $N_3$ 100 is diffused to $N_6$ 102 and 3/16 of the quantization error occurred in the process for quantizing $N_3$ 100 is diffused to $N_5$ 104.

Whenever one pixel is quantized, some pixels around the current quantized pixel partially receive the quantization errors of the current quantized pixel. Quantization errors are continuously accumulated. Since the quantization errors occurring in the error diffusion process are diffused to neighboring pixels, an error due to a quantization error between the neighboring pixels can be reduced.

This error diffusion process has a problem in that a computation amount increases since computations in a range of real numbers, such as 7/16, 5/16, 3/16, and 1/16, are necessary for neighboring pixels whenever one pixel is quantized, as shown in FIG. 1. In a relatively large printer or PDP TV, an additional processor is provided to process operations in the error diffusion process in order to achieve a fast response rate. An internal system is designed in which operations can be parallel processed in an error diffusion process. At a fast response rate, image quality improved by error diffusion can be provided to users.

However, a size of a mobile communication terminal is limited due to mobility and portability. It is difficult to provide an additional process in the limited size. When a parallel processing scheme of an additional processor is not used, there is a problem in that a response rate may be significantly reduced according to a computation amount in the error diffusion process. For these reasons, an error diffusion method may not be applied to current mobile communication terminals.

SUMMARY OF THE INVENTION

The present invention addresses at least the above problems and/or disadvantages and provides at least the advantages described below. Accordingly, an aspect of the present invention is to provide an apparatus and method that can provide users with qualities of motion or still images significantly improved by reducing quantization errors in a mobile communication terminal.

Another aspect of the present invention is to provide an apparatus and method that can reduce quantization errors in an error diffusion process so an error diffusion method can be applied to a mobile communication terminal.

In accordance with an aspect of the present invention, there is provided an apparatus for improving qualities of motion and still images to be output in a mobile communication terminal, the apparatus including a display for displaying an applied image in a color representation scheme based on a number of bits; an error diffuser for computing quantization errors by sequentially selecting pixels constructing an original image when the original image is input, computing pixel-by-pixel error values accumulated according to error diffusion of quantized pixels by adding stored error values related to a current pixel to error-reflected values determined by error-reflected ratios based on positions of at least one neighboring pixel around a selected pixel and the computed quantization errors, and generating an error-diffused image by reflecting the pixel-by-pixel error values in quantization values in a current color representation scheme for the pixels of the original image; and a controller for inputting a selected original image to the error diffuser when a user selects the original image to be output and controlling the display to output the error-diffused image in place of the original image when the error-diffused image is generated.

In accordance with another aspect of the present invention, there is provided a method for improving qualities of motion and still images to be output in a mobile communication terminal, the method including sequentially selecting pixels constructing an original image in a processing sequence when the original image is input; computing quantization errors based on a color signal-by-color signal by quantizing a currently selected pixel; selecting neighboring pixels around the currently selected pixel and determining error-reflected ratios based on positions of the neighboring pixels; determining error-reflected values of the neighboring pixels based on the color signal-by-color signal according to computed quantization errors and error-reflected ratios of the neighboring pixels; accumulating the determined error-reflected values based on the color signal-by-color signal for pixel-by-pixel error values related to the currently selected pixel; generating an error-diffused image by adding color signal-by-color signal quantization error values of the pixels of the original image to pixel-by-pixel error values related to the pixels of the original image when quantization errors of all the pixels of the original image are completely computed; and outputting the error-diffused image.

In accordance with still another aspect of the present invention, there is provided an apparatus for improving qualities of motion and still images to be output in a mobile communication terminal, the apparatus including a display for displaying an output image of applied motion-image data in a color representation scheme based on a number of bits; a motion-image decoder for decoding the motion-image data; an error diffuser for computing quantization errors by sequentially selecting pixels constructing an output image of the motion-image data when the decoded motion-image data is input, computing pixel-by-pixel error values accumulated according to error diffusion of quantized pixels by adding stored error values related to a current pixel to error-reflected values determined by error-reflected ratios based on positions of at least one neighboring pixel around a selected pixel and the computed quantization errors, and generating an error-diffused image by reflecting the pixel-by-pixel error values in quantization values in a current color representation scheme for the pixels of the original image; and a controller for inputting decoded motion-image data to the error diffuser when a user selects the motion-image data to be output and controlling the display to output the error-diffused image when the error-diffused image is generated.

In accordance with yet another aspect of the present invention, there is provided a method for improving qualities of motion and still images to be output in a mobile communication terminal, the method including decoding motion-image data selected by a user; sequentially selecting pixels constructing an output image of the decoded motion-image data in a processing sequence; computing quantization errors based on a color signal-by-color signal by quantizing a currently selected pixel; selecting neighboring pixels around the currently selected pixel and determining error-reflected ratios based on positions of the neighboring pixels; determining error-reflected values of the neighboring pixels based on the color signal-by-color signal according to the computed quantization errors and the error-reflected ratios of the neighboring pixels; accumulating determined error-reflected values based on the color signal-by-color signal for pixel-by-pixel error values related to the currently selected pixel; generating an error-diffused image by adding color signal-by-color signal quantization error values of the pixels of the original image to pixel-by-pixel error values related to the pixels of the original image when quantization errors of all pixels of the original image are completely computed; and outputting the error-diffused image.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
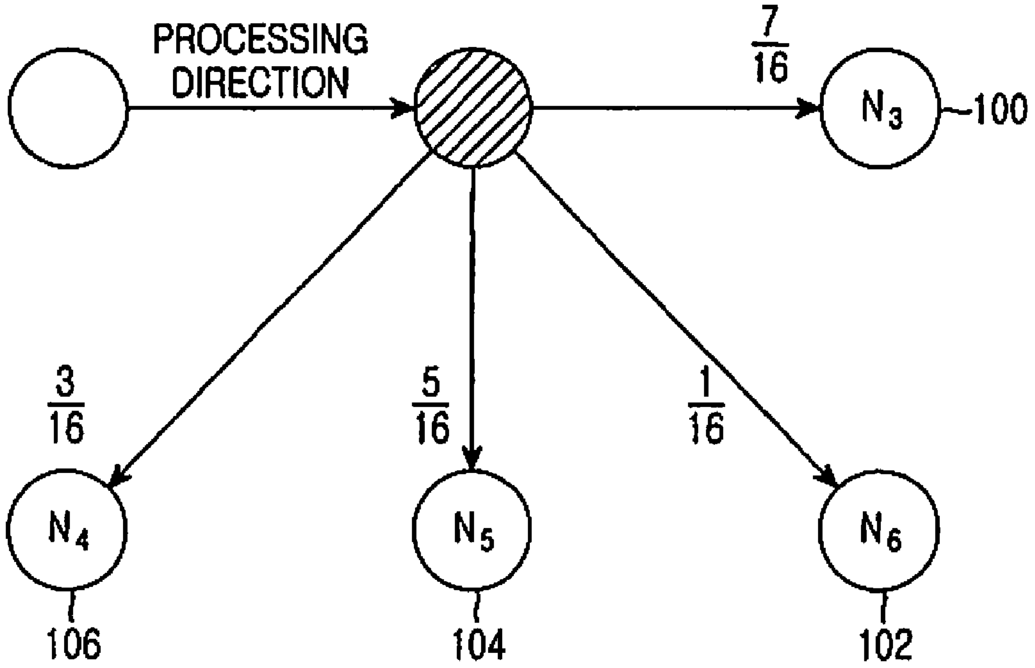
FIG. 1 (PRIOR ART)
FIG. 1 is a conventional example of error-reflected values to be applied upon error diffusion.

Preferred embodiments of the present invention will be described in detail herein below with reference to the accompanying drawings. In the drawings, the same or similar elements are denoted by the same reference numerals even though they are depicted in different drawings. Descriptions of well-known functions and constructions are omitted for clarity and conciseness.

If a display of a mobile communication terminal can provide the same image quality level as that of an original image, the present invention is not necessary. However, if the quality of the original image may not be provided due to a physical limitation of the display of the mobile communication terminal, the present invention can be applied when pixels of the original image are quantized. It is assumed herein that quantization does not indicate a process for converting analog data into digital data, but indicates a process for converting a pixel represented by a quantization value of a larger number of bits into a quantization value of a smaller number of bits.

For a better understanding of the present invention, a basic principle of the present invention will be first described. In the present invention, a table is provided which includes quantization-error-reflected values computed in advance based on maximum values of quantization errors and error-reflected ratios of neighboring pixels in order to reduce a computation amount while an error diffusion process is used. When quantization errors of a specific pixel selected from an original image are computed in a processing procedure, error-reflected values of neighboring pixels around the selected pixel are determined by the computed quantization errors. Pixel-by-pixel error values are stored by accumulating error-reflected values for associated pixels. When another pixel is selected in the processing procedure, neighboring pixels around the selected pixel are selected. Error-reflected values of the selected neighboring pixels are computed by repeating the above-described process. When pixel-by-pixel error values related to a pixel are pre-stored in a pixel-by-pixel error memory, error-reflected values are accumulated on a pixel-by-pixel basis by adding the pixel-by-pixel error values to currently computed error-reflected values. When error-reflected values are completely accumulated for neighboring pixels around all pixels of the original image, a quantization-error-diffused image is generated by adding the error-reflected values on the pixel-by-pixel basis. The error-diffused image is stored and displayed in place of the original image when a user makes a request. In the present invention, a mobile communication terminal can provide the user with an image of quality improved in the error diffusion process.

Figure 2:
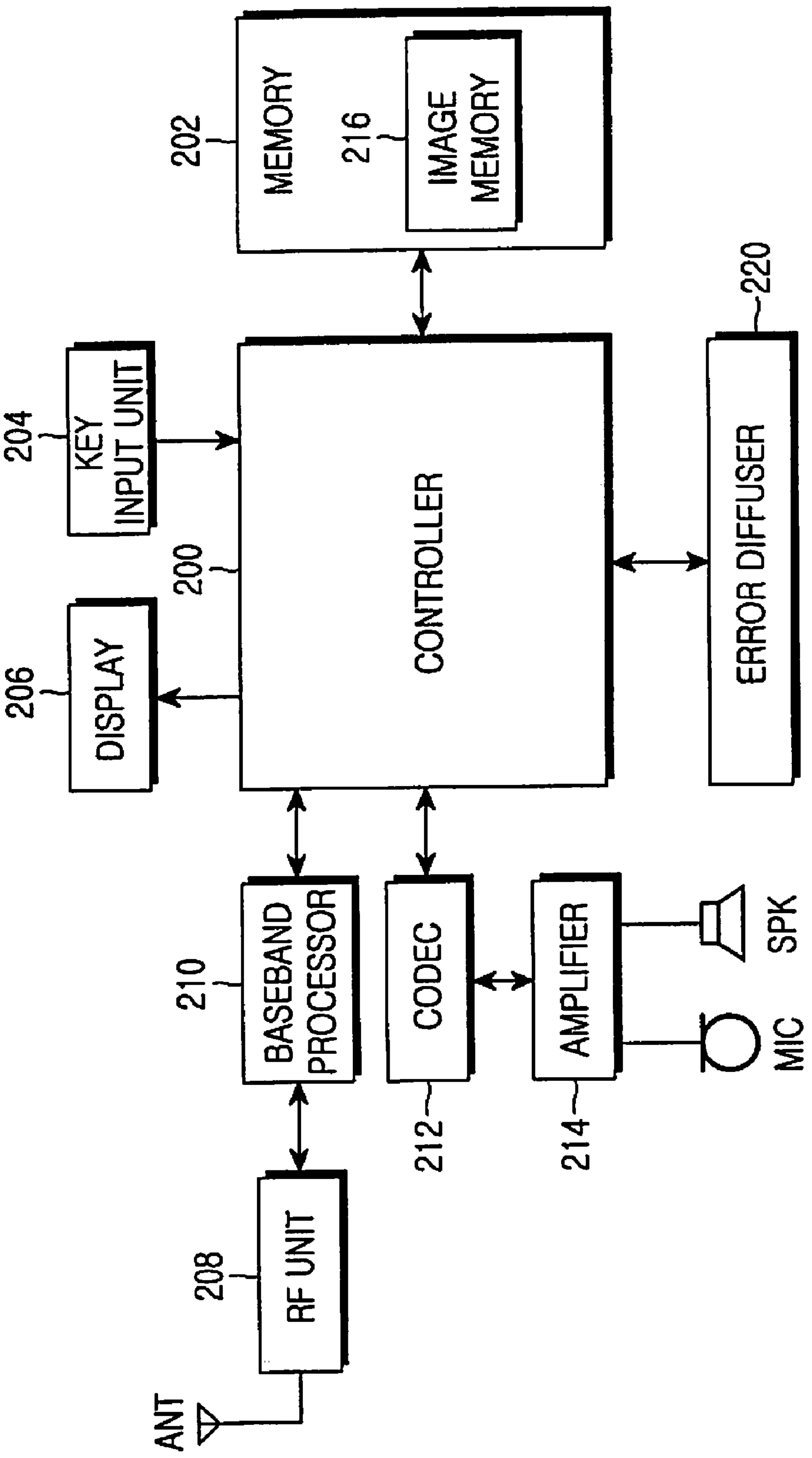
FIG. 2 is a block diagram of a mobile communication terminal in accordance with the present invention.

FIG. 2 shows a mobile communication terminal in accordance with the present invention. The mobile communication terminal includes a controller 200, a memory 202 connected to the controller 200, a key input unit 204, a display 206, a baseband processor 210, a coder-decoder (codec) 212, and an error diffuser 220. The controller 200 processes voice signals and data according to a protocol for wireless Internet access and phone calling or data communication, and controls the components of the mobile communication terminal. The controller 200 can control the display 206 in response to a key input of a user and can generate and provide image information in response to a key input of a user.

In the present invention, the controller 200 of the mobile communication terminal inputs an image selected by a user to the error diffuser 220 when the user makes a request for displaying a specific image, improves image quality using an error diffusion process, and controls the display 206 to display an image whose quality is improved.

When the specific image is input, the error diffuser 220 selects a first pixel from among pixels of the specific image, referred to herein as the original image, according to the processing procedure. Quantization errors of color signals of the currently selected pixel can be computed by quantizing the currently selected pixel. Neighboring pixels around the currently selected pixel are selected. Quantization-error-reflected values of the neighboring pixels are determined by error-reflected ratios based on positions of the selected neighboring pixels and the quantization errors computed from the currently selected pixel. If quantization-error-reflected values are determined for all neighboring pixels currently selected, the determined values are stored as pixel-by-pixel error values related to the neighboring pixels. If the pixel-by-pixel error values related to the neighboring pixels are pre-stored, the error diffuser 220 accumulates currently determined error-reflected values to the pre-stored pixel-by-pixel error values and stores the accumulated values. The error diffuser 220 repeats a process for determining error-reflected values of neighboring pixels currently quantized until all pixels of the original image are selected and quantized.

When all the pixels of the original image are completely quantized, that is, a neighboring pixel to be processed is no longer present after the last pixel of the original image is quantized, the error diffuser 220 adds quantization values of the pixels of the original image to the stored pixel-by-pixel error values related to the pixels. If the neighboring pixel to be processed is no longer present, the process for determining error-reflected values of the neighboring pixels is not performed. The process for adding the quantization values of the pixels to the stored pixel-by-pixel error values related to the pixels is performed based on a color signal-by-color signal.

When the original image represented by a larger number of bits are represented by a smaller number of bits due to a physical limitation of the display 206 of the mobile communication terminal in accordance with the present invention, ratios between color signal-by-color signal quantization errors of the pixels are reflected in neighboring pixels. An error-diffused image is generated by storing an image in which error values of the pixels are reflected in neighboring pixels.

The error diffuser 220 can significantly reduce a time required to determine error-reflected values based on maximum values of quantization errors occurring in the selected pixels and error-reflected ratios according to positions of neighboring pixels using an error-reflected-value table storing pre-computed quantization-error-reflected values.

For example, as shown in FIG. 1, a quantization-error-reflected ratio of a neighboring pixel positioned in the same direction as a processing direction is set to 7/16. A quantization-error-reflected ratio of a neighboring pixel positioned on a vertical line from a pixel to be currently quantized is set to 5/16. A quantization-error-reflected ratio of a neighboring pixel positioned on a diagonal line rather than the vertical or horizontal line from the pixel to be currently quantized in the processing direction is set to 1/16. A quantization-error-reflected ratio of a neighboring pixel positioned on a diagonal line in a direction reverse to the processing direction rather than the vertical or horizontal line from the pixel to be currently quantized is set to 3/16. In this case, it can be assumed that the error-reflected ratios are four ratios of 7/16, 1/16, 5/16, and 3/16.

If the display 206 can display a Red-Green-Blue (RGB) color image of a maximum of 16 bits (R: 5 bits, G: 6 bits, and B: 5 bits) when the original image is an RGB color image represented by 24 bits (R: 8 bits, G: 8 bits, and B: 8 bits), the maximum quantization errors of color signals can have 3 bits related to eight steps of Step 0 to Step 7 in the red, 2 bits related to four steps of Step 0 to Step 3 in the green, and 3 bits related to eight steps of Step 0 to Step 7 in the blue. In this case, error-reflected values reflecting quantization errors are shown in Table 1.

TABLE 1

| Error-Reflected Ratios | Quantization Errors | Error-Reflected Values |
|---|---|---|
| 3/16 | 0 | 0 |
| 3/16 | 1 | 0 |
| 3/16 | 2 | 0 |
| 3/16 | 3 | 1 |
| 3/16 | 4 | 1 |
| 3/16 | 5 | 1 |
| 3/16 | 6 | 1 |
| 3/16 | 7 | 1 |
| 5/16 | 0 | 0 |

TABLE 1-continued

| Error-Reflected Ratios | Quantization Errors | Error-Reflected Values |
|---|---|---|
| 5/16 | 1 | 0 |
| 5/16 | 2 | 1 |
| 5/16 | 3 | 1 |
| 5/16 | 4 | 1 |
| 5/16 | 5 | 2 |
| 5/16 | 6 | 2 |
| 5/16 | 7 | 2 |
| 7/16 | 0 | 0 |
| 7/16 | 1 | 0 |
| 7/16 | 2 | 1 |
| 7/16 | 3 | 1 |
| 7/16 | 4 | 2 |
| 7/16 | 5 | 2 |
| 7/16 | 6 | 3 |
| 7/16 | 7 | 3 |

It is assumed that Table 1 uses an integer value output by rounding off an actual real number corresponding to a computation result. Of course, the computation result can also use the actual real number. This case significantly increases a computation amount rather than the effect. Thus it is assumed that an integer value computed by rounding off an actual real number is used in the present invention.

An actual real number is rounded off to an integer value as described above. In this case, a rounding-off value becomes 0 since a computation value is 7/16, even when a maximum quantization error value is 7 at the error-reflected ratio of 1/16. Since all error-reflected values become 0 at the error-reflected ratio of 1/16, the quantization error is not reflected. For this reason, the error-reflected ratio of 1/16 is not included in the error-reflected-value table, as shown in Table 1 in the present invention. Of course, if actual error-reflected values are present at the time of using different error-reflected ratios, error-reflected values computed based on all error-reflected ratios should be included in the error-reflected-value table.

Details of the error diffuser 220 for computing and applying quantization errors of the original image in the mobile communication terminal in accordance with the present invention will be described with reference to FIG. 3.

When the error diffuser 220 completely applies error diffusion, the controller 200 receives and stores an image to which the error diffusion is completely applied from the error diffuser 220. The stored image is output through the display 206. The present invention can provide the user with an image having higher quality than that of a conventional quantization process.

An example in which error diffusion is applied to an image has been described above. Since motion images correspond to continuously output still images, the above-described method can be equally applied to the motion images. The motion images can be motion images received through a satellite or terrestrial digital multimedia broadcasting reception channel and a wired/wireless data communication channel as well as motion images pre-stored by the user. The controller 200 of the mobile communication terminal can simultaneously perform decoding and error-diffusion processes for received motion-image data by error-diffusing the received motion-image data through the error diffuser 220 while decoding the received motion-image data. While first received motion-image data is newly stored and output in an error diffusion process, subsequently received motion-image data is decoded. The error diffusion can be applied to an output of a motion image. This case will be described with reference to FIG. 6.

The memory 202 connected to the controller 200 is constructed with a Read Only Memory (ROM), a flash memory, a Random Access Memory (RAM), and the like. The ROM stores a program for processing and controlling of the controller 200 and various reference data. The RAM serves as a working memory of the controller 200. The flash memory includes an area for storing repository data capable of being updated and an area for storing an original image or an error-diffused image. The area for storing the original image or the error-diffused image is referred to as an image memory 216.

The key input unit 204 is provided with various keys including number keys. The key input unit 204 provides a key input from the user to the controller 200. A Radio Frequency (RF) unit 208 receives an RF signal from and transmits an RF signal to a base station. The received signal is converted into an Intermediate Frequency (IF) signal. The IF signal is output to a baseband processor 210 connected to the controller 200. The baseband processor 210 is a BaseBand Analog (BBA) Application-Specific Integrated Circuit (ASIC) for providing an interface between the controller 200 and the RF unit 208. The baseband processor 210 converts a digital baseband signal applied from the controller 200 into an analog IF signal and applies the analog IF signal to the RF unit 208. The baseband processor 210 converts an analog IF signal applied from the RF unit 208 into a digital baseband signal and applies the digital baseband signal to the controller 200. When the mobile communication terminal can receive satellite or terrestrial digital broadcasting in accordance with the present invention, the RF unit 208 and the baseband processor 210 receive digital broadcasting data on a broadcast channel set by the user from a broadcasting station or satellite and then output the received digital broadcasting data to the controller 200.

The codec 212 connected to the controller 200 is coupled to a microphone and a speaker through an amplifier 214. A voice signal input from the microphone is encoded in a Pulse Code Modulation (PCM) encoding process and voice data is output to the controller 200. Voice data input from the controller 200 is PCM-decoded and output to the speaker through the amplifier 214. The amplifier 214 amplifies a voice signal input from the microphone or output to the speaker. Under control of the controller 200, speaker volume and microphone gain are adjusted.

Figure 3:
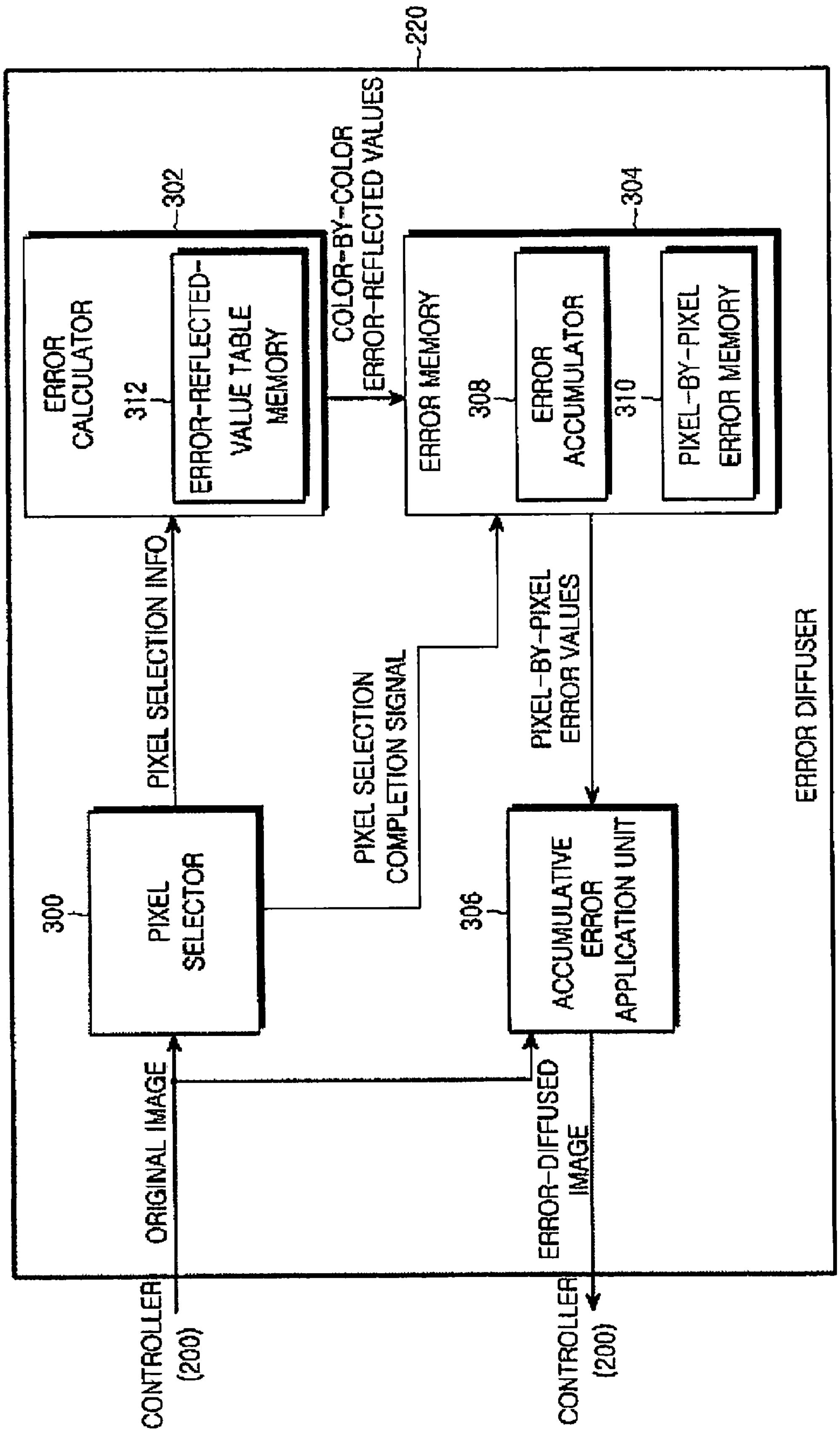
FIG. 3 is a block diagram of details of an error diffuser for computing quantization errors of an original image and applying computed error values in the mobile communication terminal in accordance with the present invention.

FIG. 3 shows the error diffuser 220 for computing quantization errors of an original image and applying error values based on the computed quantization errors in a mobile communication terminal in accordance with the present invention. Referring to FIG. 3, the error diffuser 220 can be constructed with a pixel selector 300, an error calculator 302, an error memory 304, and an accumulative error application unit 306.

The pixel selector 300 selects one pixel in a processing procedure when the original image is input from the controller 200. Information regarding positions of neighboring pixels around the selected pixel and error-reflected ratios of the neighboring pixels is output to the error calculator 302. When a pixel selected in the processing procedure is the last pixel of the original image, a pixel selection completion signal is output to the error memory 304.

The error calculator 302 quantizes the selected pixel in the processing procedure and computes quantization errors as the quantization result. Error-reflected values of the neighboring pixels around the current quantized pixel are determined by error-reflected ratios for the neighboring pixels input from the pixel selector 300 using the quantization errors. The error calculator 302 is provided with an error-reflected-value table memory 312 in which an error-reflected-value table can be stored as shown in Table 1. The error-reflected-value table memory 312 can use a memory (for example, a cache memory) having a higher response rate and a higher access rate than those of a general memory (for example, a flash memory), so a rate at which the error calculator 302 can determine the error-reflected values can increase. The error calculator 302 outputs determined error-reflected values related to the neighboring pixels to the error memory 304. The error-reflected values are computed for color signals constructing the neighboring pixels.

On the other hand, the error memory 304 determines whether pixel-by-pixel error values related to each of the neighboring pixels are pre-stored when error-reflected values of neighboring pixels are received from the error calculator 302. If pixel-by-pixel error values related to a pixel are not pre-stored in the pixel-by-pixel error memory 310, currently input error-reflected values are stored as the pixel-by-pixel error values. If the pixel-by-pixel error values related to the pixel are pre-stored in the pixel-by-pixel error memory 310, the pixel-by-pixel error values related to the pixel and error-reflected values related to the pixel determined in the error calculator 302 are input to an error accumulator 308. The error accumulator 308 computes accumulated values. The pixel-by-pixel error memory 310 stores the computed values as the pixel-by-pixel error values related to the pixel.

When pixel-by-pixel error values related to the neighboring pixels currently input from the error calculator 302 are completely stored, the error memory 304 determines whether a pixel selection completion signal is received from the pixel selector 300. When receiving the pixel selection completion signal, the error calculator 302 determines that pixel-by-pixel error values based on error diffusion of pixels of the original image are completely stored. Pixel-by-pixel error values stored up to now are output to the accumulative error application unit 306.

The accumulative error application unit 306 generates an error-diffused image by adding pixel-by-pixel error values input from the error memory 304 to quantization values of pixels of the original image applied from the controller 200 based on a color signal-by-color signal. When the error-diffused image is completely generated, the accumulative error application unit 306 outputs the generated image to the controller 200. The controller 200 stores the error-diffused image in the image memory 216. In this case, the controller 200 can store the error-diffused image in place of the original image or can display the error-diffused image in place of the original image when an original image display request is made. When the user makes a request for displaying the same image, the error-diffused image is displayed without the error diffusion process. When the image is repeatedly displayed, a fast response rate can be achieved.

Figure 4:
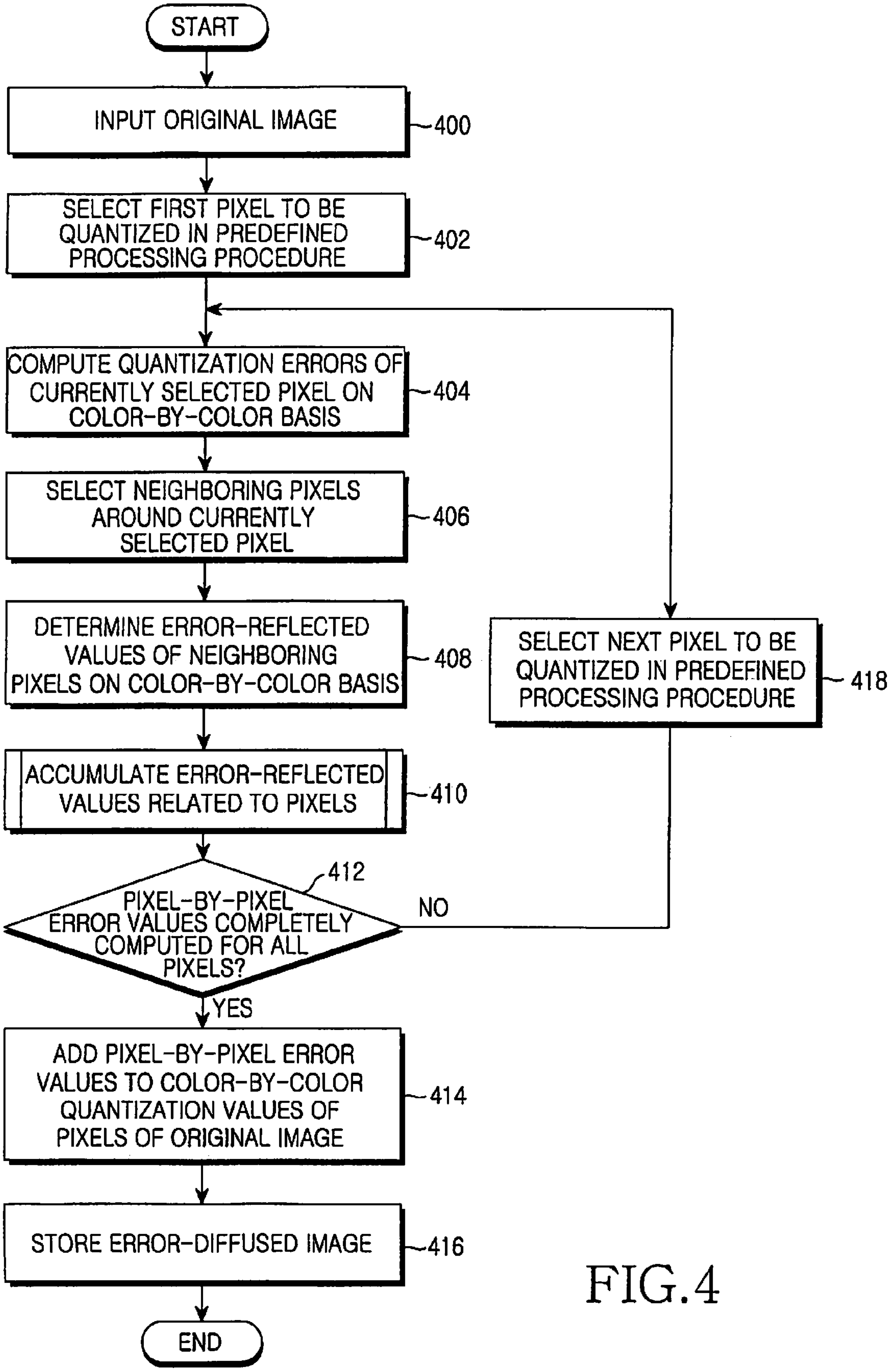
FIG. 4 is a flowchart of an operation for generating an image to which error diffusion is applied in the mobile communication terminal in accordance with the present invention.

FIG. 4 shows an operation for generating an error-diffused image when the controller 200 of the mobile communication terminal controls the error diffuser 220 in accordance with the present invention. When the user makes a request for displaying a specific original image, the controller 200 of the mobile communication terminal proceeds to step 400 to input the original image selected by the user to the error diffuser 220. The controller 200 proceeds to step 402 to select a first pixel to be quantized from among pixels of the original image in a processing procedure. In step 404, the currently selected pixel is quantized, and quantization errors of the currently selected pixel are computed based on a color signal-by-color signal.

The controller 200 proceeds to step 406 to select neighboring pixels around the currently selected pixel. The controller 200 selects different error-reflected ratios in directions in which the neighboring pixels are currently positioned. The controller 200 proceeds to step 408 to determine error-reflected values of the neighboring pixels at error-reflected ratios based on positions of the neighboring pixels selected in step 406 and quantization errors occurring in processes for quantizing the selected pixels in the processing procedure. In step 408, the error-reflected values are determined using the error-reflected-value table including quantization-error-reflected values pre-computed based on maximum values of the quantization errors and the error-reflected ratios of the neighboring pixels as shown in Table 1.

When the error-reflected values of the neighboring pixels are determined, the controller 200 proceeds to step 410 to accumulate error-reflected values of the associated pixels using the currently determined error-reflected values. When pixel-by-pixel error values related to a current pixel are not pre-stored in the pixel-by-pixel error memory 310 in step 410, the error-reflected values input in step 408 are stored as the pixel-by-pixel error values. If the pixel-by-pixel error values are pre-stored, values computed by adding the pixel-by-pixel error values input in step 408 to the pixel-by-pixel error values related to the associated pixel stored in the pixel-by-pixel error memory 310 are stored. When error-reflected values related to a specific pixel are repeatedly input, the error-reflected values are continuously accumulated and stored as pixel-by-pixel error values. The process of step 410 will be described with reference to FIG. 5.

When a process for computing pixel-by-pixel error values related to neighboring pixels is completed, the controller 200 proceeds to step 412 to determine whether pixel-by-pixel error values related to all pixels of the original image are completely computed. The controller 200 can determine whether there are any more neighboring pixels around a pixel selected in the processing procedure. For example, when there are no more neighboring pixels around the selected pixel, as shown in FIG. 1, the currently selected pixel is the last pixel of the original image in the processing procedure. When a neighboring pixel around the selected pixel is absent, the controller 200 can determine that pixel-by-pixel error values are completely computed in relation to all the pixels of the original image. This is because pixel-by-pixel error values no longer need to be accumulated when there are no more neighboring pixels in the case of the last pixel.

Upon determining that the pixel-by-pixel error values are not completely computed in relation to all the pixels of the original image in step 412, the controller 200 proceeds to step 418 to select the next pixel to be quantized in the processing procedure. The controller 200 again proceeds to step 404 to quantize the currently selected pixel and output quantization errors based on quantization results. In step 406, neighboring pixels around the current quantized pixel are selected. The process of steps 408 to 412 is repeated.

Upon determining that the pixel-by-pixel error values related to all the pixels of the original image are completely computed in step 412, the controller 200 proceeds to step 414 to add the pixel-by-pixel error values to color signal-by-color signal quantization values of the pixels of the original image. Then, the controller 200 proceeds to step 416 to store an error-diffused image in which the pixel-by-pixel error values are added to the color signal-by-color signal quantization values in the original image. The controller 200 can store the error-diffused image in place of the original image as described above.

Figure 5:
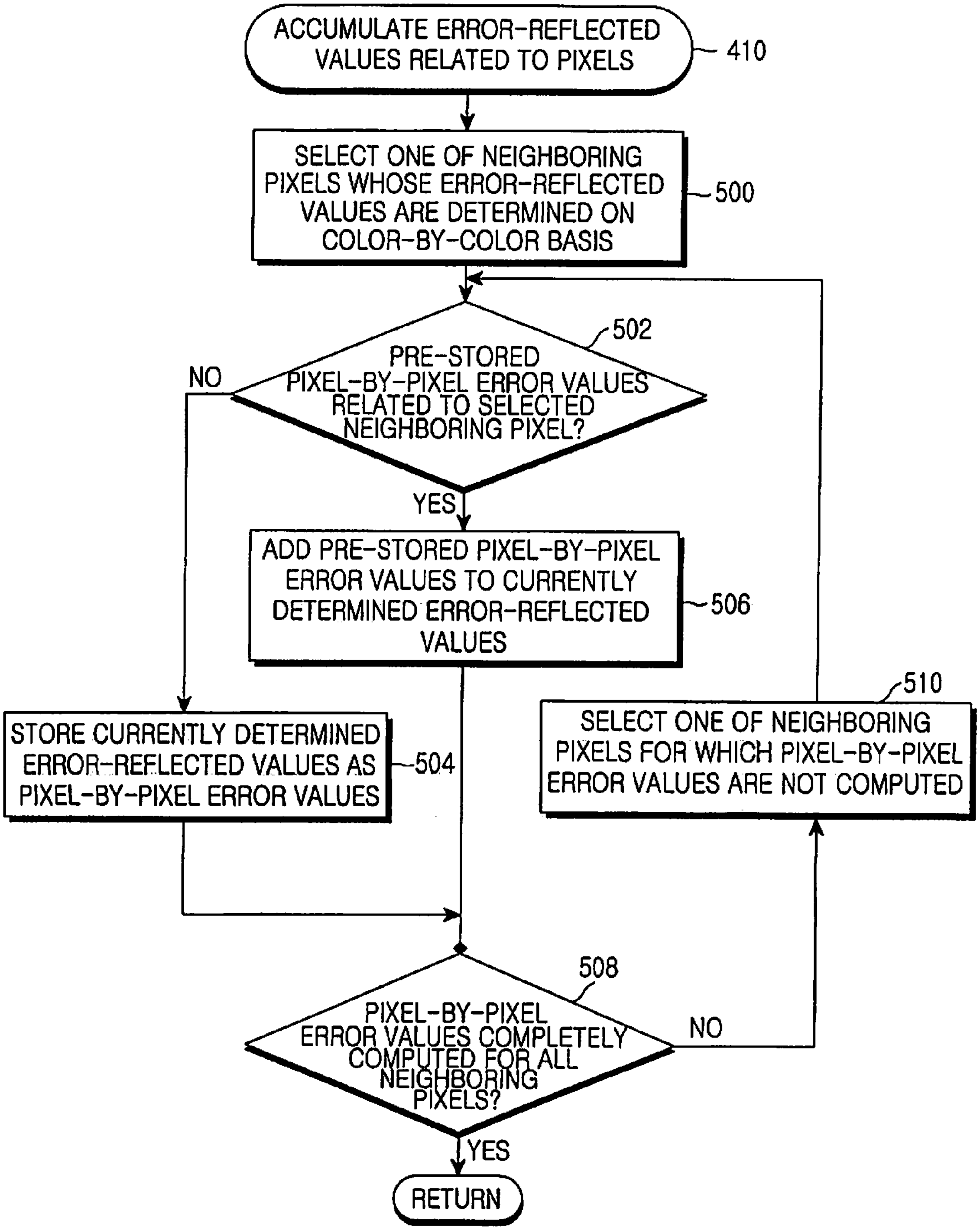
FIG. 5 is a flowchart of an operation for computing pixel-by-pixel error values for neighboring pixels around a currently selected pixel in the mobile communication terminal in accordance with the present invention.

FIG. 5 shows an operation for computing pixel-by-pixel error values by accumulating error-reflected values of neighboring pixels around a currently selected pixel in the mobile communication terminal in accordance with the present invention. When the error-reflected values of the neighboring pixels are determined in step 408, the controller 200 selects one of the neighboring pixels for which current error-reflected values are determined in step 500. The controller 200 proceeds to step 502 to determine whether pixel-by-pixel error values related to the currently selected neighboring pixel are pre-stored in the pixel-by-pixel error memory 310. If the pixel-by-pixel error values related to the currently selected neighboring pixel are not pre-stored, the controller 200 proceeds to step 504 to store currently determined error-reflected values of neighboring pixels around the currently selected neighboring pixel as the pixel-by-pixel error values related to the currently selected neighboring pixel. Then, the controller 200 proceeds to step 508.

Upon determining that the pixel-by-pixel error values related to the currently selected neighboring pixel are not pre-stored in step 502, the controller 200 proceeds to step 506 to store results obtained by adding the pre-stored pixel-by-pixel error values related to the currently selected neighboring pixel to the currently determined error-reflected values of the neighboring pixels around the currently selected neighboring pixel. Then, the controller 200 proceeds to step 508.

After step 506 or 504 is performed, the controller 200 proceeds to step 508 to determine whether pixel-by-pixel error values related to all neighboring pixels currently selected are completely computed. If the pixel-by-pixel error values related to all the neighboring pixels currently selected are not completely computed, the controller 200 proceeds to step 510 to select one neighboring pixel for which pixel-by-pixel error values are not computed. Then, the controller 200 again proceeds to step 502 to determine whether the pixel-by-pixel error values related to the currently selected neighboring pixel are pre-stored. According to determination result, the controller 200 again performs step 504 or 506.

Upon determining that the pixel-by-pixel error values related to the currently selected neighboring pixel are completely computed in step 508, the controller 200 proceeds to step 412 of FIG. 4 to determine whether pixel-by-pixel error values related to all the pixels of the original image are completely computed. According to determination result, the controller 200 proceeds to step 418 or 414. If multiple neighboring pixels around a specific pixel are selected and multiple error-reflected values are determined, the multiple error-reflected values are accumulated and stored as pixel-by-pixel values related to the specific pixel.

When the user makes a request for displaying a specific original image in the present invention, errors are diffused by reflecting some parts of quantization errors, occurring in each pixel of the original image, in neighboring pixels. Therefore, an image whose quality is significantly improved can be displayed. In the present invention, the mobile communication terminal can further shorten the time to display an error-diffused image using an error-reflected-value table including error-reflected values pre-computed based on quantization errors and error-reflected ratios when error values are partially reflected.

The present invention can be applied to motion images as well as still images. Since motion images correspond to continuously output still images, the present invention can be applied to motion-image data received through digital multimedia broadcasting reception channels or wired/wireless data communication channels as well as pre-stored motion-image data. This case will be described with reference to another example the present invention.

Figure 6:
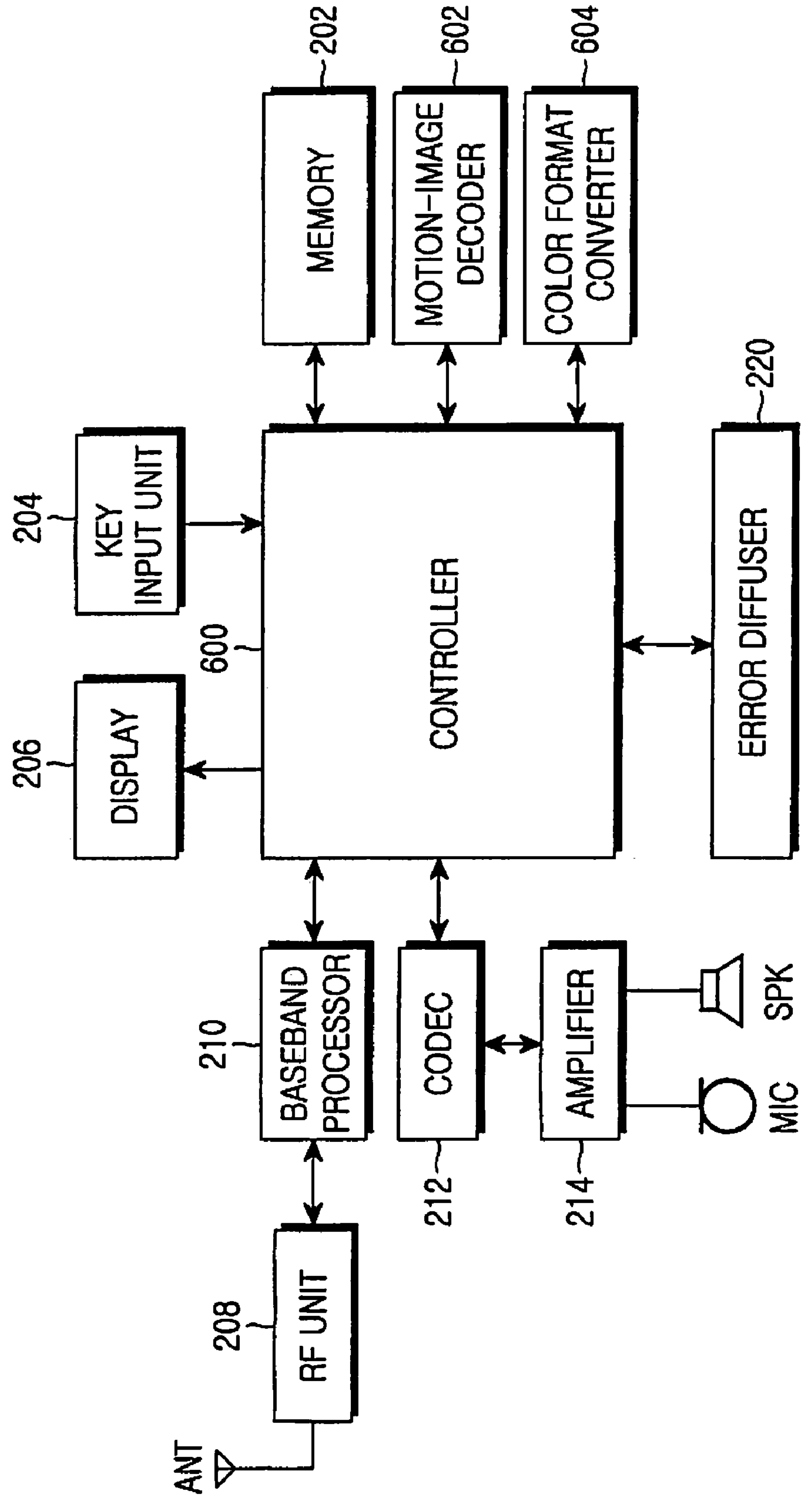
FIG. 6 is a block diagram of another mobile communication terminal for providing motion images to which error diffusion is applied in accordance with the present invention.

FIG. 6 shows another example of a mobile communication terminal for providing motion images to which error diffusion is applied in accordance with the present invention. As compared with the mobile communication terminal of FIG. 2, the mobile communication terminal of FIG. 6 further includes a motion-image decoder 602. The motion-image decoder 602 stores codec information for decoding various motion-image data. Under the control of a controller 600, the motion-image decoder 602 decodes the motion-image data applied from the controller 600 and then outputs the decoded motion-image data to the controller 600.

The controller 600 inputs the decoded data to an error diffuser 220. The error diffuser 220 performs an error diffusion process for pixels included in each output image of the decoded motion-image data in an error diffusion process. Then an error-diffused image is output to the controller 600. The controller 600 can improve quality of an image to be output from motion-image data by outputting the image to which the error diffusion is applied through the display 206.

However, when the motion-image data has a Moving Picture Experts Group (MPEG) format, an output image having a Luminance-Bandwidth-Chrominance (YUV) color format different from an RGB color format can be implemented. A YUV color format represents colors with three information elements regarding a luminance signal Y, a difference U between the luminance signal Y and a red component, and a difference V between the luminance signal Y and a blue component. In accordance with the present invention, the mobile communication terminal further includes a color format converter 604, as shown in FIG. 6. An image of a YUV color format can be converted into that of the RGB color format. Alternatively, a YUV color format can be used with a different error-reflected-value table. That is, when the color format is changed, the mobile communication terminal in accordance with the present invention can compute quantization errors occurring in a currently selected pixel based on the changed color format and can determine error-reflected values using the error-reflected-value table storing quantization-error-reflected values pre-computed at error-reflected ratios based on quantization error values and positions of neighboring pixels.

In general, when a YUV color format is a YUV 4:2:0 color format, a Y signal is a macro block having a size of 16*16 (=256), a U signal is a macro block having a size of 8*8 (=64), and a V signal is a macro block having a size of 8*8 (=64). Thus, a ratio of computation amounts of Y Signal: U Signal: V Signal is 1:1/4:1/4. Assuming that an entire image size is of horizontal 320 pixels and vertical 240 pixels, a computation amount for computing quantization errors of an image having the YUV color format is (320*240*1)+(320*240*0.25)+(320*240*0.25)=(320*240*1.5) in the YUV 4:2:0 color format.

However, when a YUV color format is converted into an RGB color format, RGB signals have the same computation amount. A computation amount for computing quantization errors is (320*240*1)+(320*240*1)+(320*240*1)=(320*240*3). The number of quantization errors to be used in the error diffusion increases twice in an RGB color format compared to a YUV color format.

Quantization errors are computed in a state in which U and V signals respectively have 4-bit errors in an existing image having a YUV color format. Since a range of quantization errors itself is large even when error diffusion is performed, image quality of a YUV color format is lower than that of an RGB color format. When the improvement of image quality has priority in the mobile communication terminal in accordance with the present invention, motion-image data of a YUV color format is converted into that of an RGB color format. The error diffuser 220 can perform an error diffusion process for the motion-image data of an RGB color format.

When performance of an image-processing rate has priority, motion-image data of a YUV color format can be input to the error diffuser 220. The error diffuser 220 can perform an error diffusion process for the motion-image data of the YUV color format. This priority can be selected as desired or can be changed in use according to a selection of a user.

If motion-image data has an RGB color format rather than a YUV color format, an opposite case can be considered. That is, when a user or designer of the mobile communication terminal assigns priority to performance of an image-processing rate, the color format converter 604 converts the motion-image data of an RGB color format into a YUV color format and inputs the converted motion-image data to the error diffuser 220, thereby reducing a computation amount for the error diffusion. When improvement of image quality has priority, motion-image data of an RGB color format can be input to the error diffuser 220. The error diffuser 220 can perform an error diffusion process for the motion-image data of the RGB color format.

As is apparent from the above description, the present invention can provide a user with motion and still images whose qualities are improved by applying an error diffusion process and reducing quantization errors in the error diffusion process when a mobile communication terminal outputs the motion and still images.

While the invention has been shown and described with reference to certain preferred embodiments of the present invention thereof, it will be understood by those skilled in the art that various changes in form and details may be made therein without departing from the spirit and scope of the present invention as defined by the appended claims and their equivalents.

What is claimed is:

1. An apparatus for improving qualities of motion and still images to be output in a mobile communication terminal, the apparatus comprising:

a display for displaying an applied image in a color representation scheme based on a predefined number of bits;

an error diffuser for computing quantization errors by sequentially selecting pixels constructing an original image when the original image is input, computing pixel-by-pixel error values by adding stored error values related to a current pixel to error-reflected values determined by predefined error-reflected ratios based on positions of at least one neighboring pixel around a selected pixel and the computed quantization errors, and generating an error-diffused image by reflecting the pixel-by-pixel error values in quantization values in a current color representation scheme for the pixels of the original image;

a controller for inputting a selected original image to the error diffuser when a user selects the original image to be output and controlling the display to output the error-diffused image in place of the original image when the error-diffused image is generated; and an error calculator for determining the error-reflected values of the at least one neighboring pixel around a current quantized pixel using an error-reflected-value table storing quantization-error-reflected values pre-computed according to quantization error values and the error-reflected ratios related to positions of neighboring pixels.

2. The apparatus of claim 1, wherein the error diffuser comprises:

a pixel selector for sequentially selecting the pixels of the original image in a processing procedure when the original image is input, and outputting information regarding the positions of the at least one neighboring pixel around the selected pixel and the error-reflected ratios of the at least one neighboring pixel;

an error memory for determining whether pixel-by-pixel error values related to the at least one neighboring pixel are pre-stored until error-reflected values of all pixels of the original image are completely determined, storing currently determined error-reflected values as pixel-by-pixel error values when pixel-by-pixel error values are not pre-stored, and storing pixel-by-pixel values computed by adding pre-stored pixel-by-pixel error values to determined error-reflected values related to the current quantized pixel when the pixel-by-pixel error values are pre-stored; and an accumulative error application unit for receiving pixel-by-pixel error values related to all pixels of the original image and generating the error-diffused image by adding the received pixel-by-pixel error values to quantization errors in a current color representation scheme of the pixels of the original image.

3. The apparatus of claim 1, wherein the error calculator determines the error-reflected values using an error-reflected-value table storing quantization-error-reflected values pre-computed according to quantization error values occurring in a currently selected pixel and the error-related ratios related to positions of neighboring pixels.

4. The apparatus of claim 3, wherein the error-reflected-value table comprises error-reflected integers when the original image is based on a 24-bit color representation scheme and the display displays an image in a 16-bit color representation scheme, the table being defined by:

| Error-Reflected Ratios | Quantization Errors | Error-Reflected Values |
|---|---|---|
| 3/16 | 0 | 0 |
| 3/16 | 1 | 0 |
| 3/16 | 2 | 0 |
| 3/16 | 3 | 1 |
| 3/16 | 4 | 1 |
| 3/16 | 5 | 1 |
| 3/16 | 6 | 1 |
| 3/16 | 7 | 1 |
| 5/16 | 0 | 0 |
| 5/16 | 1 | 0 |
| 5/16 | 2 | 1 |
| 5/16 | 3 | 1 |
| 5/16 | 4 | 1 |
| 5/16 | 5 | 2 |
| 5/16 | 6 | 2 |
| 5/16 | 7 | 2 |
| 7/16 | 0 | 0 |
| 7/16 | 1 | 0 |
| 7/16 | 2 | 1 |
| 7/16 | 3 | 1 |
| 7/16 | 4 | 2 |
| 7/16 | 5 | 2 |
| 7/16 | 6 | 3 |
| 7/16 | 7 | 3 |

5. The apparatus of claim 3, wherein the error calculator is provided with an embedded memory for storing the error-reflected-value table.

6. The apparatus of claim 5, wherein the embedded memory is a cache memory.

7. The apparatus of claim 2, wherein the pixel selector outputs a pixel selection completion signal to the error memory when a selected pixel is a last pixel of the original image in the predefined processing procedure, the error memory determining that error-reflected values of all the pixels of the original image are completely determined when the pixel selection completion signal is received.

8. The apparatus of claim 1, wherein the controller stores the error-diffused image in place of the original image.

9. A method for improving qualities of motion and still images to be output in a mobile communication terminal, the method comprising:

sequentially selecting pixels constructing an original image in a predetermined processing sequence when the original image is selected by a user;

computing quantization errors based on a color signal-by-color signal by quantizing a pixel currently selected according to the predetermined processing sequence;

selecting neighboring pixels around the currently selected pixel and determining error-reflected ratios based on positions of the neighboring pixels;

determining error-reflected values of the neighboring pixels based on the color signal-by-color signal according to computed quantization errors and error-reflected ratios of the neighboring pixels;

accumulating by an error diffuser the determined error-reflected values based on the color signal-by-color signal for pixel-by-pixel error values related to pixels;

generating by the error diffuser an error-diffused image by adding color signal-by-color signal quantization error values of the pixels of the original image to pixel-by-pixel error values related to the pixels of the original image when quantization errors of all the pixels of the original image are completely computed; and outputting the error-diffused image.

10. The method of claim 9, wherein determining the error-reflected values comprises:

determining the error-reflected values using an error-reflected-value table storing quantization-error-reflected values pre-computed according to quantization error values occurring in a currently selected pixel and the error-reflected ratios related to positions of neighboring pixels.

11. The method of claim 9, wherein the error-reflected-value table comprises error-reflected integers when the original image is based on a 24-bit color representation scheme and the display displays an image in a 16-bit color representation scheme, the table being defined by:

| Error-Reflected Ratios | Quantization Errors | Error-Reflected Values |
|---|---|---|
| 3/16 | 0 | 0 |
| 3/16 | 1 | 0 |
| 3/16 | 2 | 0 |
| 3/16 | 3 | 1 |
| 3/16 | 4 | 1 |
| 3/16 | 5 | 1 |
| 3/16 | 6 | 1 |
| 3/16 | 7 | 1 |
| 5/16 | 0 | 0 |
| 5/16 | 1 | 0 |
| 5/16 | 2 | 1 |
| 5/16 | 3 | 1 |
| 5/16 | 4 | 1 |
| 5/16 | 5 | 2 |
| 5/16 | 6 | 2 |
| 5/16 | 7 | 2 |
| 7/16 | 0 | 0 |
| 7/16 | 1 | 0 |
| 7/16 | 2 | 1 |
| 7/16 | 3 | 1 |
| 7/16 | 4 | 2 |
| 7/16 | 5 | 2 |
| 7/16 | 6 | 3 |
| 7/16 | 7 | 3 |

12. The method of claim 9, wherein generating the error-diffused image comprises:

storing the error-diffused image in place of the original image.

13. An apparatus for improving qualities of motion and still images to be output in a mobile communication terminal, the apparatus comprising:

a display for displaying an output image of applied motion-image data in a color representation scheme based on a predefined number of bits;

a motion-image decoder for decoding the motion-image data;

an error diffuser for computing quantization errors by sequentially selecting pixels constructing an output image of the motion-image data when the decoded motion-image data is input, computing pixel-by-pixel error values by adding stored error values related to a current pixel to error-reflected values determined by predefined error-reflected ratios based on positions of at least one neighboring pixel around a selected pixel and the computed quantization errors, and generating an error-diffused image by reflecting the pixel-by-pixel error values in quantization values for the pixels of the output image, and determining the error-reflected values using an error-reflected-value table storing quantization-error-reflected values pre-computed according to quantization error values and the error-reflected ratios related to positions of neighboring pixels; and a controller for inputting decoded motion-image data to the error diffuser when a user selects the motion-image data to be output, and controlling the display to output the error-diffused image when the error-diffused image is generated.

14. The apparatus of claim 13, wherein the motion-image data has a Luminance-Bandwidth-Chrominance (YUV) color format.

15. The apparatus of claim 14, wherein the error diffuser computes quantization errors occurring in a currently selected pixel in the YUV color format.

16. The apparatus of claim 13, further comprising:

a color format converter for converting a color format of the motion-image data into another predetermined color format.

17. The apparatus of claim 16, wherein the error diffuser computes quantization errors occurring in a currently selected pixel in the converted color format when the color format of the motion-image data is converted.

18. The apparatus of claim 16, wherein the color format converter converts the motion-image data from Red-Green-Blue (RGB) color format to a Luminance-Bandwidth-Chrominance (YUV) color format and converts the motion-image data from the YUV color format to the RGB color format.

19. The apparatus of claim 13, wherein the motion-image data is received on of a satellite digital multimedia broadcasting reception channel or a terrestrial digital multimedia broadcasting reception channel.

20. A method for improving qualities of motion and still images to be output in a mobile communication terminal, the method comprising:

decoding motion-image data selected by a user;

sequentially selecting pixels constructing an output image of the decoded-motion-image data in a predefined processing sequence;

computing quantization errors based on a color signal-by-color signal by quantizing a currently selected pixel;

determining error-reflected ratios based on positions of the neighboring pixels around the currently selected pixel;

determining error-reflected values of the neighboring pixels based on the color signal-by-color signal according to computed quantization errors and error-reflected ratios of the neighboring pixels;

accumulating by an error diffuser determined error-reflected values based on the color signal-by-color signal for pixel-by-pixel error values related to the currently selected pixel;

generating by the error diffuser an error-diffused image by adding color signal-by-color signal quantization error values of the pixels of the output image to pixel-by-pixel error values related to the pixels of the output image when quantization errors of all pixels of the original image are completely computed; and outputting the error-diffused image.

21. The method of claim 20, wherein the motion-image data has a Luminance-Bandwidth-Chrominance (YUV) color format.

22. The method of claim 21, wherein determining the error-reflected values comprises:

determining the error-reflected values using an error-reflected-value table storing quantization-error-reflected values pre-computed according to quantization error values occurring in a currently selected pixel in the YUV color format and the error-reflected ratios related to positions of neighboring pixels.

23. The method of claim 20, wherein decoding comprises:

decoding the motion-image data; and converting a color format of the decoded motion-image data into another predetermined color format.

24. The method of claim 23, wherein determining the error-reflected values comprises:

computing quantization errors occurring in a currently selected pixel in the convened color format and determining the error-reflected values using an error-reflected-value table storing quantization-error-reflected values pre-computed according to quantization error values and the error-reflected ratios related to positions of neighboring pixels.

25. The method of claim 20, wherein the motion-image data is received on a satellite digital multimedia broadcasting reception channel and a terrestrial digital multimedia broadcasting reception channel.

* * * * *